United States Patent
Ilyas et al.

(10) Patent No.: US 10,496,153 B2
(45) Date of Patent: Dec. 3, 2019

(54) METHOD AND SYSTEM FOR BINDING CHASSIS AND COMPONENTS

(71) Applicant: EMC IP Holding Company LLC, Hopkinton, MA (US)

(72) Inventors: Mohammed Hasheem Ilyas, Kingston (CA); Akshita Das, Gujarat (IN); Monica Mishra, Boston, MA (US); Sachinkumar S. Patil, Jamakhandi (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 138 days.

(21) Appl. No.: 15/796,061

(22) Filed: Oct. 27, 2017

(65) Prior Publication Data

US 2019/0129497 A1 May 2, 2019

(51) Int. Cl.
G06F 1/3287 (2019.01)
G06F 9/445 (2018.01)

(52) U.S. Cl.
CPC ........ G06F 1/3287 (2013.01); G06F 9/44505 (2013.01)

(58) Field of Classification Search
CPC .. G06F 1/3287; G06F 9/4411; G06F 9/44505; G06F 21/73; G06F 21/81
USPC .................. 713/2, 193, 1; 709/224, 220, 217
See application file for complete search history.

(56) References Cited

U.S. PATENT DOCUMENTS

| | | | |
|---|---|---|---|
| 6,317,028 B1 * | 11/2001 | Valiulis | G08B 13/1418 340/10.1 |
| 7,103,874 B2 | 9/2006 | McCollum et al. | |
| 7,222,127 B1 | 5/2007 | Bem et al. | |
| 7,516,362 B2 | 4/2009 | Connelly et al. | |
| 7,831,693 B2 | 11/2010 | Lai | |
| 7,886,031 B1 * | 2/2011 | Taylor | H04L 41/0873 709/220 |
| 7,987,353 B2 | 7/2011 | Holdaway et al. | |
| 8,166,552 B2 | 4/2012 | Prafullchandra et al. | |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,639,798 B2 * | 1/2014 | Akiyama | G06F 16/288 709/224 |
| 8,826,077 B2 | 9/2014 | Bobak et al. | |
| 8,868,987 B2 | 10/2014 | Wagner | |
| 8,874,892 B1 | 10/2014 | Chan et al. | |
| 8,995,439 B2 | 3/2015 | Field | |
| 9,122,501 B1 | 9/2015 | Hsu et al. | |
| 9,201,751 B1 | 12/2015 | Muthirisavenugopal et al. | |
| 9,278,481 B2 | 3/2016 | Hull | |

(Continued)

OTHER PUBLICATIONS

Extended European Search Report issued in corresponding European Application No. 18200661.9 dated Apr. 1, 2019. (9 pages).

(Continued)

*Primary Examiner* — Aurel Prifti (74) *Attorney, Agent, or Firm* — Chamberlain, Hrdlicka, White, Williams & Aughtry (57) ABSTRACT

A computing device includes a chassis and a processor. The processor obtains a computing device identifier from a removable component disposed in the chassis. The processor makes a determination that the removable component is bound to a second computing device based on the obtained computing device identifier. In response to the first determination, the processor disables the removable component.

19 Claims, 11 Drawing Sheets

(56) References Cited

U.S. PATENT DOCUMENTS

| | | | |
|---|---|---|---|
| 9,355,036 B2 | 5/2016 | Beard et al. | |
| 9,542,177 B1 | 1/2017 | Johansson et al. | |
| 9,864,634 B2 | 1/2018 | Kenkre et al. | |
| 9,898,224 B1 | 2/2018 | Marshak et al. | |
| 10,057,184 B1 | 8/2018 | Prahlad et al. | |
| 10,097,620 B2 | 10/2018 | Reddy et al. | |
| 2001/0044782 A1* | 11/2001 | Hughes | G06F 21/10 705/59 |
| 2004/0088145 A1 | 5/2004 | Rosenthal | |
| 2004/0177168 A1* | 9/2004 | Alabraba | G06F 21/10 710/1 |
| 2006/0178864 A1 | 8/2006 | Khanijo | |
| 2006/0179116 A1* | 8/2006 | Speeter | G06F 8/71 709/217 |
| 2008/0228755 A1* | 9/2008 | Haga | G06F 11/008 |
| 2009/0012805 A1* | 1/2009 | Schnell | G06Q 30/06 705/310 |
| 2009/0165099 A1 | 6/2009 | Eldar et al. | |
| 2009/0183010 A1* | 7/2009 | Schnell | G06F 21/10 713/193 |
| 2009/0260071 A1* | 10/2009 | Sadovsky | H04L 63/0853 726/9 |
| 2010/0024001 A1 | 1/2010 | Campbell | |
| 2011/0078428 A1* | 3/2011 | Hamid | G06F 9/4411 713/2 |
| 2011/0093703 A1 | 4/2011 | Etchegoyen | |
| 2012/0041976 A1 | 2/2012 | Annapragada | |
| 2012/0110142 A1 | 5/2012 | Montagna et al. | |
| 2012/0150926 A1 | 6/2012 | Adkins et al. | |
| 2012/0182151 A1 | 7/2012 | Tong | |
| 2012/0331526 A1* | 12/2012 | Caudle | G06F 21/6209 726/4 |
| 2014/0069291 A1 | 3/2014 | Yang | |
| 2014/0281675 A1 | 9/2014 | Sreenivasan | |
| 2015/0256394 A1 | 9/2015 | Palmer | |
| 2016/0048611 A1 | 2/2016 | Cox | |
| 2016/0057009 A1 | 2/2016 | Kadayam et al. | |
| 2016/0302323 A1 | 10/2016 | Gosselin | |
| 2017/0094003 A1 | 3/2017 | Gahlot et al. | |
| 2017/0339005 A1 | 11/2017 | Yuan et al. | |
| 2018/0034709 A1* | 2/2018 | Chen | H04L 41/32 |
| 2018/0285009 A1* | 10/2018 | Guim Bernat | G06F 3/0604 |

OTHER PUBLICATIONS

"Integrated Dell Remote Access Controller 8 (iDRAC8)", Version 2.05.05.05 User's Guide, Dell Inc., Dec. 2014 (348 pages).
Iler, Doug, et al., "Introducing iDRAC8 with Lifecycle Controller for Dell 13th Generation PowerEdge Servers", A Dell Deployment and Configuration Guide, Dell Inc., Sep. 2014 (16 pages).
Duncan Tweed; "BMC Atrium Discovery User Guide"; BMC Software, Inc.; Mar. 2014; retrieved from https://bmc.com/.
Duncan Tweed; "Baseline configuration"; BMC Software, Inc.; Apr. 7, 2015; retrieved from https://bmc.com/.
Masoom Parvez; "AutomaticGroup Node"; BMC Software, Inc.; 2014; retrieved from https://bmc.com/.
Extended European Search Report issued in corresponding European Application No. 19151952.9, dated Jul. 1, 2019.
Extended European Search Report issued in corresponding European Application No. 19165339.3, dated Aug. 6, 2019 (12 pages).
"Dell EMC OpenManage Essentials Version 2.3: User's Guide"; XP055602720; Oct. 1, 2017; https://topics-cdn.dell.com/pdf/openmanage-essentials-v23 users-guide en-us.pdf (376 pages).
"Dell DRAC—Wikipedia"; XP055602141; Mar. 23, 2018; https://en.wikipedia.org/w/index.php?title=Dell_DRAC&oldid=831957421 (8 pages).
Extended European Search Report issued in corresponding European Application No. 19165337.7, dated Aug. 28, 2019 (11 pages).

* cited by examiner

METHOD AND SYSTEM FOR BINDING CHASSIS AND COMPONENTS

BACKGROUND

Computing devices may include multiple components. For example, a computing device may include a chassis, a processor, a memory module, and a video card.

The components of a computing device may be detachable from the computing device. For example, a video card housed in a chassis of a computing device may be removed.

A component that is removed from a computing device may be inserted and used in a second computing device. For example, a first computing device may include a chassis housing a video card. The video card may be removed from the first computing device and may be inserted into a housing of a second computing device.

Component interconnection standards have driven component producers to produce components that are generally compatible with a large number of computing devices. For example, the peripheral component interconnect express is a high-speed serial computer expansion bus standard that has been adopted by a large number of motherboard manufacturers. Due to its broad adoption, component producers have introduced components that may be used in a large number of computing devices by virtue of interconnecting with computing devices via the high-speed serial computer expansion bus standard.

SUMMARY

In one aspect, a computing device includes a chassis and a processor. The processor obtains a computing device identifier from a removable component disposed in the chassis; makes a first determination that the removable component is bound to a second computing device based on the obtained computing device identifier; and in response to the first determination, disables the removable component.

In one aspect, a method for operating a computing device in accordance with one or more embodiments of the invention includes obtaining a computing device identifier from a removable component disposed in a chassis of the computing device; making a first determination that the removable component is bound to a second computing device based on the obtained computing device identifier; and in response to the first determination, disabling the removable component.

In one aspect, a non-transitory computer readable storage medium in accordance with one or more embodiments of the invention stores instructions, the instructions when executed by a processor cause the processor to perform a method of operating a computing device, the method includes obtaining a computing device identifier from a removable component disposed in a chassis of the computing device; making a first determination that the removable component is bound to a second computing device based on the obtained computing device identifier; and in response to the first determination, disabling the removable component.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-4B, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the invention relate to systems, devices, and methods for managing removable components. The removable components may be operable with a number of computing devices. The removable components may be managed based on logical collections that associate any number of removable components with a particular computing devices. The logical collections may be defined based on bindings between removable components and computing devices.

A system in accordance with embodiments of the invention includes a number of computing devices. Each of the computing devices may include a chassis for housing removable components. As used herein, a removable component refers to a device that may be housed by a chassis of a computing device. When housed in a chassis, the removable component may operably connect to the corresponding computing device.

In one or more embodiments of the invention, a removable component may be bound to a computing device. As used herein, a bound removable component refers to a removable component that is associated with a computing device, i.e., a member of a logical collection include a computing device and the removable component. In one or more embodiments of the invention, a removable component may be bound to a computing device by storing an identifier of the computing device in the removable component. The stored identifier may be referred to as a binding.

In one or more embodiments of the invention, each computing device may check to determine whether a removable component disposed in a chassis of the respective computing device is bound to a different computing device. If the removable component is bound to a different computing device, the computing device may disable the removable component. If the removable component is not bound to another computing device, the computing device activates the removable component if already bound to the computing device or binds the removable component to the computing device if the removable component is not bound to any computing device and activates the removable component after binding the removable component.

Figure 1A:
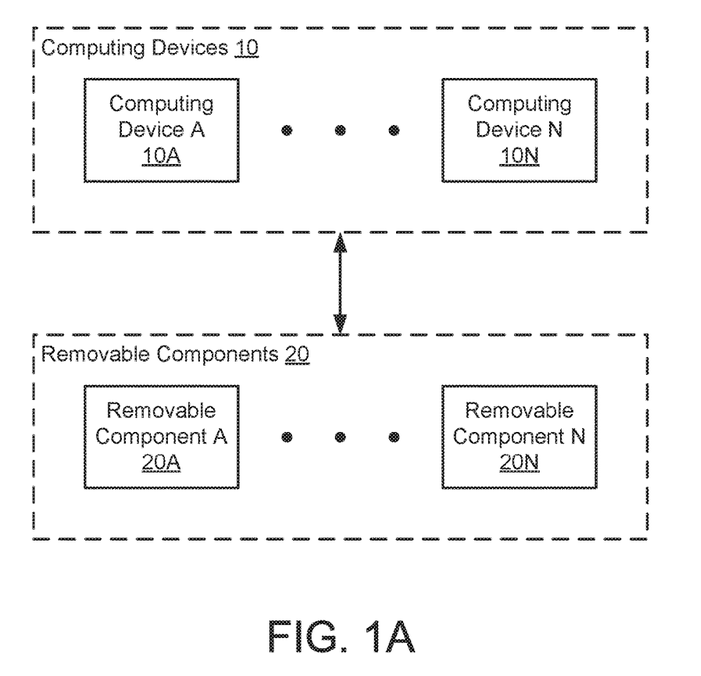
FIG. 1A show a diagram of a system in accordance with one or more embodiments of the technology.

FIG. 1A shows a system in accordance with one or more embodiments of the invention. The system includes a number of computing device (10) and a number of removable components (20). The system may manage the removable components (10) by: (i) binding removable components to computing devices and (ii) activating or disabling removable components based on the bindings. Each component of the system is discussed below.

In one or more embodiments of the invention, the computing devices (10) may be physical devices. The physical devices may include a processor, memory, and non-transitory computer readable storage housed in a chassis. The non-transitory storage may include instructions which, when executed by the processor, provide the computing devices (10) with the functionality described throughout this application and to perform the methods illustrated in FIGS. 3A-3E. The chassis be a physical structure that includes bays, or other structures, for housing removable components, in addition to the processor, memory, and non-transitory computer readable storage. The chassis may be, for example, a rack mount frame having a number of 1U, 2U, 3U, and/or other bays.

In one or more embodiments of the invention, the computing devices (10) may manage removable components by activating or disabling the removable components. For example, a computing device may activate or disable a removable component disposed in a chassis of the computing device based on: (i) bind of the removable component and (ii) and identifier of the computing device. For additional details regarding the computing devices (10), See FIG. 10.

In one or more embodiments of the invention, the removable components (20) may be physical devices. The physical devices may include circuitry, non-transitory computer readable storage, and/or one or more electrical devices. The devices may be, for example, processors, filters, memory, resistors, capacitors, transformers, digital signal processors, programmable gate arrays, and/or application specific integrated circuits. The electrical devices may be of other types without departing from the invention. The physical devices may be, for example, rack compatible server modules in a 2U rack format. The physical devices may be in other formats without departing from the invention.

In one or more embodiments of the invention, the non-transitory computer readable storage of the removable components (20) may specify a binding of the respective removable component. The binding may specify a relationship between the respective removable component and a computing device of the computing devices. For example, the relationship may be that the respective removable component is only to be operated while disposed in the chassis of the associated computing device.

In one or more embodiments of the invention, each of the removable components (20) may be adapted to be disposed in a chassis of one or more of the computing device (10). As used herein, adapted to be disposed in a chassis means to have a shape that enables the removable component to be disposed in a bay, or other structure, of a chassis of a computing device. For example, a removable component may have a shape corresponding to a rack unit, e.g., 1U, 2U, 3U, etc., of a chassis of a computing device to be adapted to be disposed in the chassis.

In one or more embodiments of the invention, an operable connection may be formed between a removable component and a computing device when the removable component is disposed in the chassis of the computing device. For example, when a removable component is disposed in a chassis, a wired connection between the removable component and the computing device may be formed. The operable connection may be used by the computing devices (10) to ascertain a binding of the removable component. For additional details regarding the removable components (20), See FIG. 1C.

Figure 1B:
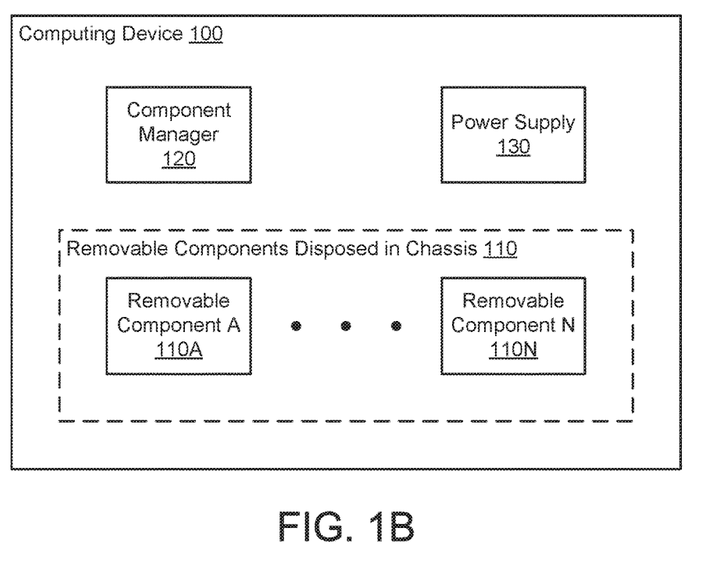
FIG. 1B show a diagram of a computing device of the system in accordance with one or more embodiments of the technology.
Figure 1C:
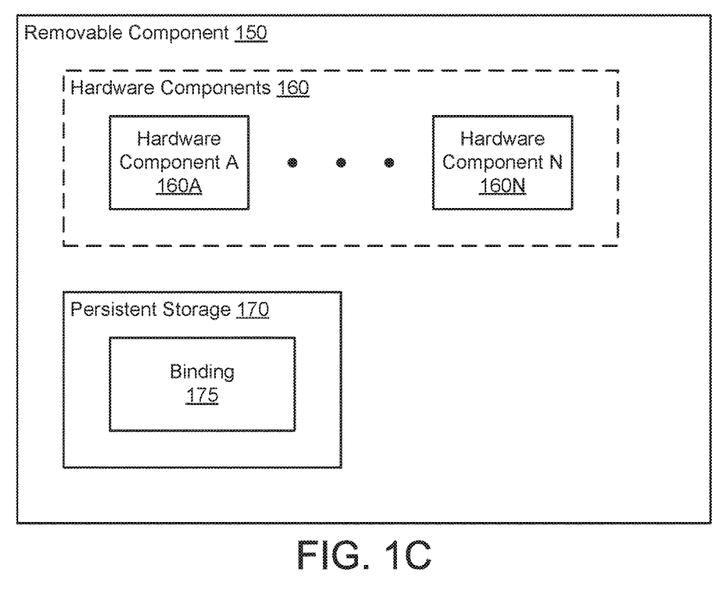
FIG. 1C show a diagram of a removable component of the system in accordance with one or more embodiments of the technology.

To further clarify the system shown in FIG. 1A, examples of computing devices and removable components are shown in FIGS. 1B and 1C, respectively.

FIG. 1B shows an example computing device (100) in accordance with one or more embodiments of the invention. The computing device (100) may include a component manager (120) that manages removable components disposed in a chassis (110) of the computing device (100) and a power supply (130) that supplies power to the removable component disposed in the chassis (110). Each component of the computing device (100) is described below.

The component manager (120) may manage removable components disposed in the chassis (110) of the computing device (100). In one or more embodiments of the invention, the component manager (120) may manage the removable components by: (i) determining bindings of the removable components, (ii) controlling power flow from the power supply to the removable components based on the bindings, and/or (iii) binding the removable components to the computing device (100).

In one or more embodiments of the invention, the component manager (120) may be implemented as computer readable instructions stored on a non-transitory computer readable storage that are executed by a processor that provide the aforementioned functionality of the component manager (120). In one or more embodiments of the invention, the aforementioned functionality of the component manager (120) may be provided by performing the methods illustrated in FIGS. 3A-3E.

In one or more embodiments of the invention, the component manager (120) may be implemented as a physical device. The physical device may be, for example, an application specific integrated circuit, a programmable gate array, or other hardware device. The physical device may include circuitry that provides the above noted functionality of the component manager (120). In one or more embodiments of the invention, the above noted functionality of the component manager (120) may be provided by performing the methods illustrated in FIGS. 3A-3E.

The power supply (130) may selectively provide power to the removable components disposed in the chassis (110) based on instructions received from the component manager (120). For example, when a removable component is inserted into the chassis of the computing device (100), the component manager (120) may instruct the power supply (130) to provide power to the removable.

In one or more embodiments of the invention, the power supply (130) maybe be operably connected to the component manager (120) and may be responsive to instructions sent by the component manager (120) over the operable connection. The operable connection may be a wired, wireless, or any other type of communication channel.

In one or more embodiments of the invention, the power supply (130) may: (i) fully power a removable component, (ii) partially power a removable component, and/or (iii) disable a removable component by stopping the flow of power to the removable component or not providing power to the removable component.

As used herein, to fully power a removable component means to supply power to activate both a primary function and a secondary function of a removable component. As used herein, a secondary function refers to a function of the removable component used to notify a computing device (100, FIG. 1) of a binding and/or establish a new binding between the removable component and a computing device. As used herein, a primary function refers to a computing, networking, or other function of the removable component that is distinguishable from the secondary function.

As used herein, to partially power a removable component means to supply power to activate a secondary function of a removable component without activating a primary function of the removable component. Partially powering a removable component may be accomplished by, for example, only supplying power to a portion of the removable component that facilitates performance of the secondary function.

FIG. 1C shows an example removable component (150) in accordance with one or more embodiments of the invention. The removable component (150) may include hardware components (160) and a persistent storage (170). Each component of the computing device (100) is described below.

The hardware components (160) may be physical devices that enable the removable component (150) to perform its primary function. The physical devices may be any type of electrical component. The electrical components may be, for example, transistors, processors, memory, resistors, persistent storage, or capacitors. The electrical components may be other passive/active electrical devices without departing from the invention.

A portion of the hardware components (160) may enable the removable component (150) to perform its secondary function, e.g., notify computing devices of bindings and/or binding the removable component to a computing device. In one or more embodiments of the invention, the portion of the hardware components (160) may be selectively powered separately from the remaining portion of the hardware components (160). Thus, the power supply (130, FIG. 1B) of a computing device may fully power, partially power, or disable a removable component by selectively powering portions of the removable component.

The persistent storage (170) may store a binding (175), i.e., an association between the removable component and a computing device. The persistent storage (170) may be any type of non-transitory computer readable storage medium without departing from the invention.

In one or more embodiments of the invention, the binding (175) may be a data structure that specifies a computing device to which the removable component is bound. In one or more embodiments of the invention, the binding (175) includes an identifier of the computing device to which the removable component is bound. If the removable component is not bound to a computing device, the binding (175) may be empty, may be null, or may include a byte sequence that indicates that the removable component is not bound to any computing device.

Figure 2:
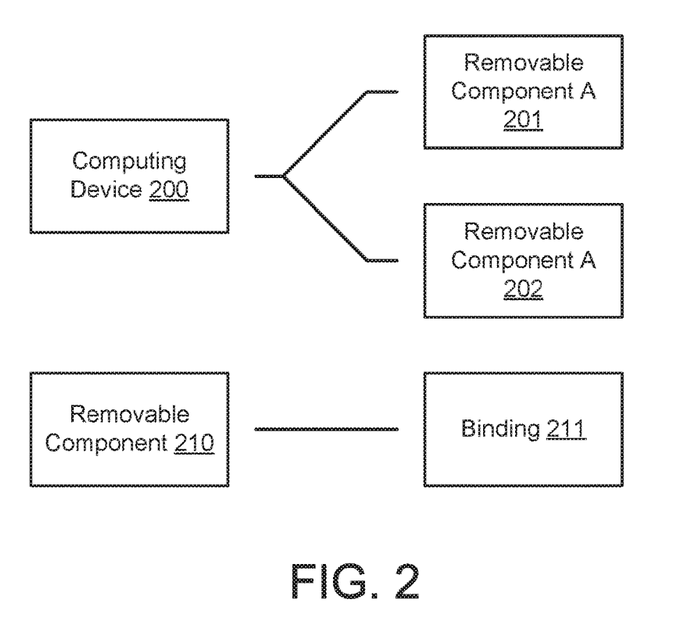
FIG. 2 show a diagram of relationships between computing devices, removable components, and computing device identifiers in accordance with one or more embodiments of the technology.

To further clarify the relationships between computing devices, removable components, and computing device identifiers, FIG. 2 shows a relationship diagram. The lines between boxes in FIG. 2 indicate relationships within the system of FIG. 1A and between components of the system.

As seen from FIG. 2, a computing device (200) may be associated with multiple removable components (201, 202). For example, multiple removable component may be bound to a single computing device. The aforementioned bindings may be formed when or while the removable components are disposed in a chassis of the computing device (200). Once bound to the computing device (200), the bindings may persist after the removable components (201, 202) are removed from the computing device (200).

Additionally, as seen from FIG. 2, each removable component may be associated with a corresponding binding (211). In other words, a removable component (210) may only be bound to a single computing device at a time by virtue of the one to one relationship between removable components and bindings.

As noted above with respect to FIGS. 1A-1C, the computing devices (100) may perform various methods to provide the functionality described throughout this application. FIGS. 3A-3E illustrate methods that may be performed by the computing devices (100) to provide the aforementioned functionality. The aforementioned functionality may be provided by performing other methods without departing from the invention.

While illustrated as separate methods, each of the methods illustrated in FIGS. 3A-3E may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

Figure 3A:
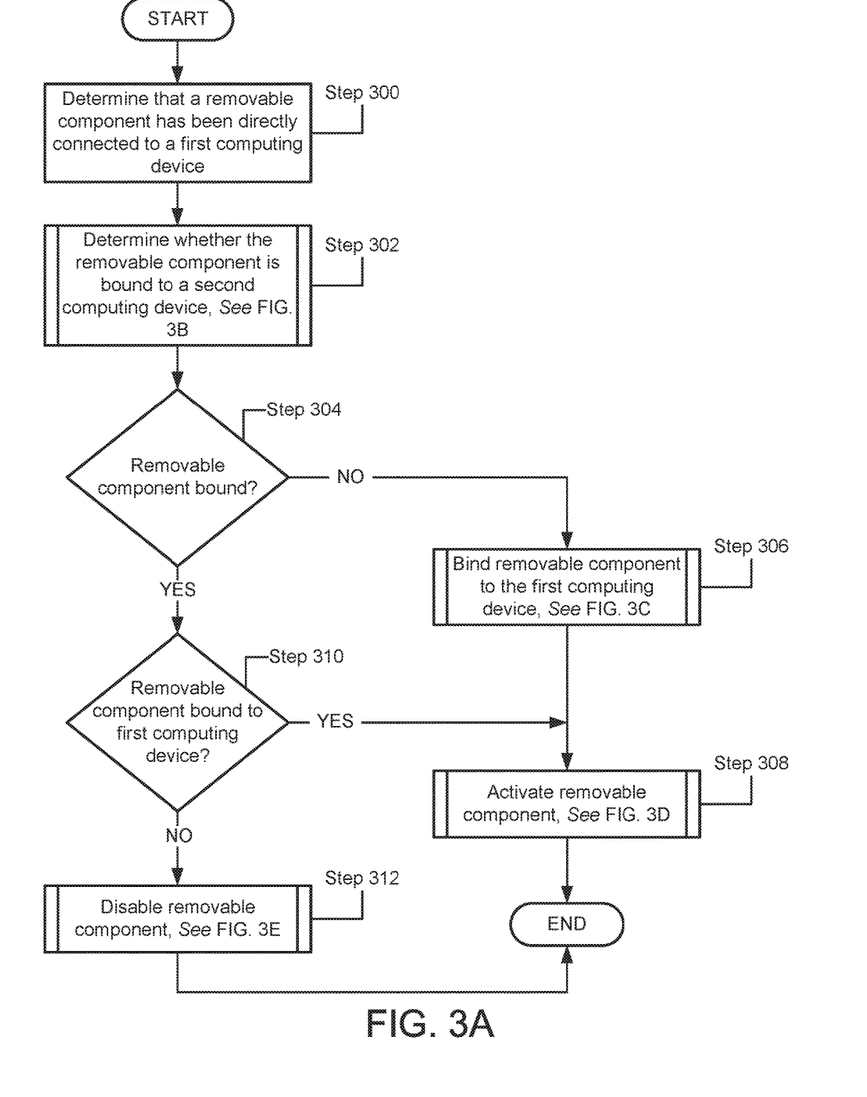
FIG. 3A shows a flowchart of a method of operating a computing device in accordance with one or more embodiments of the technology.

FIG. 3A shows a flowchart of a method in accordance with one or more embodiments of the invention. The method depicted in FIG. 3A may be used to manage removable components in accordance with one or more embodiments of the invention. The method shown in FIG. 3A may be performed by, for example, a component manager (120, FIG. 1B). The method may be performed by other components of the computing device (100, FIG. 1B) without departing from the invention.

In Step 300, it is determined that a removable component has been directly connected to a first computing device.

In one or more embodiments of the invention, the determination may be made by receiving a notification from the removable component via an operable connection that the removable component has connected to the first computing device. The notification may be made when the removable component attempts to register with the first computing device.

In one or more embodiments of the invention, the determination may be made by, for example, detecting that the removable component has been directly connected to the first computing device. The detection may be made by the first computing device by monitoring a change in a load pull on the power supply.

In one or more embodiments of the invention, the determination in Step 300 may be performed in response to the removable component being inserted in a chassis of the computing device. In one or more embodiments of the invention, the determination in Step 300 may be performed after the removable component is disposed in a chassis of the computing device.

In Step 302, it is determined whether the removable component is bound to a second computing device.

In one or more embodiments of the invention, the determination may be made based on a binding stored in the removable component.

In one or more embodiments of the invention, the determination in Step 302 may be performed in response to the removable component being inserted in a chassis of the computing device. In one or more embodiments of the invention, the determination in Step 302 may be performed while the removable component is disposed in a chassis of the computing device. In one or more embodiments of the invention, the determination in Step 302 may be performed while the removable component is not disposed in a chassis of the second computing device. In one or more embodiments of the invention, the determination in Step 302 may be performed after the removable component is removed from a chassis of the second computing device.

Figure 3B:
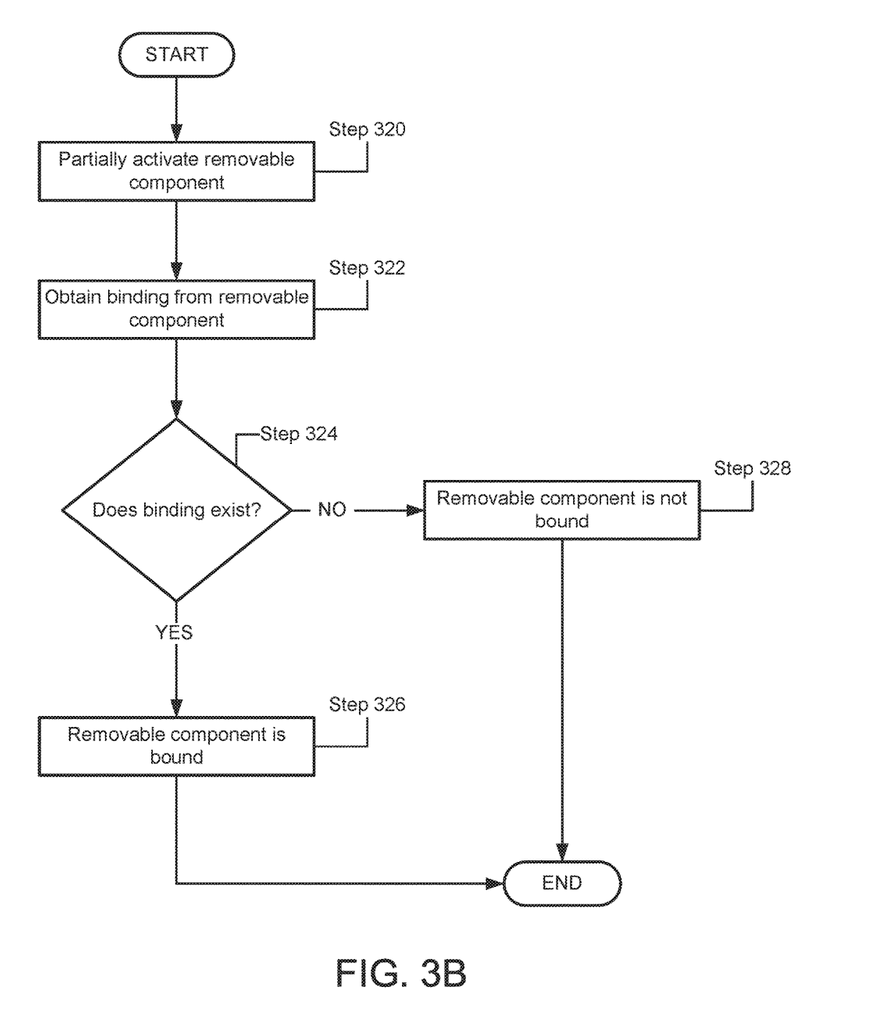
FIG. 3B shows a flowchart of a method of determining whether a removable component is bound to a second computing device in accordance with one or more embodiments of the technology.

In one or more embodiments of the invention, the determination may be made via the method illustrated in FIG. 3B.

In Step 304, if the removable component is bound to a second component as determined in Step 302, the method proceeds to Step 310. If the removable component is not bound to the second component as determined in Step 302, the method proceeds to Step 306.

In Step 306, the removable component is bound to the first computing device.

In one or more embodiments of the invention, the removable component may be bound to the first computing device using an identifier of the first removable component.

Figure 3C:
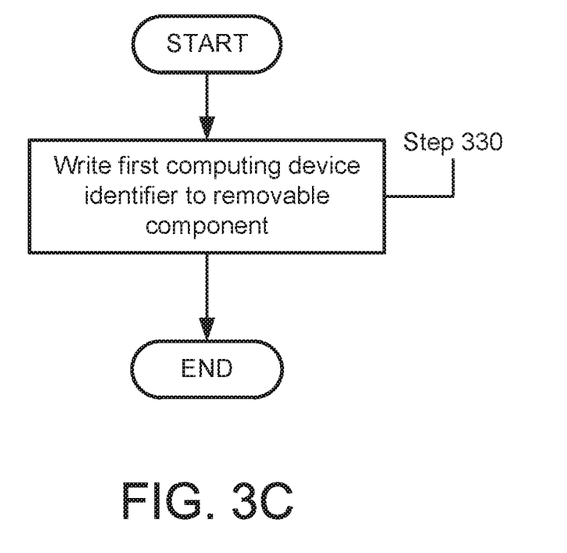
FIG. 3C shows a flowchart of a method of binding a removable component to a computing device n in accordance with one or more embodiments of the technology.

In one or more embodiments of the invention, the removable component is bound via the method illustrated in FIG. 3C.

In Step 308, the removable component is activated.

In one or more embodiments of the invention, the removable component is activated using the power supply by fully powering the removable component.

Figure 3D:
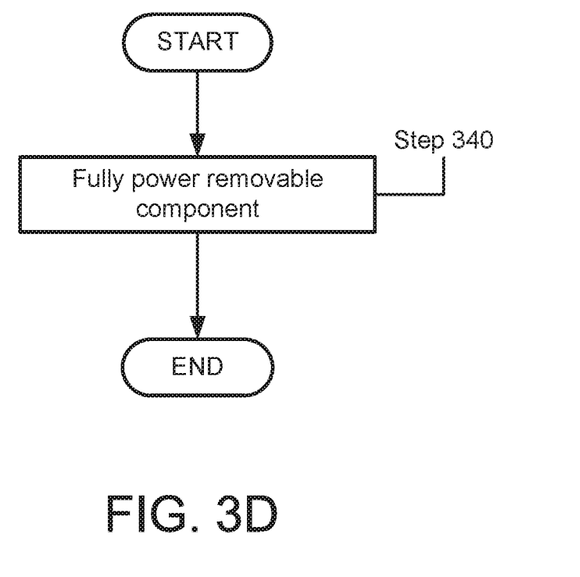
FIG. 3D shows a flowchart of a method of activating a removable component in accordance with one or more embodiments of the technology.

In one or more embodiments of the invention, the removable component is activated via the method illustrated in FIG. 3D.

The method may end following Step 308.

Returning to Step 304, the method may proceed to Step 310 if the removable component is bound to a second computing device.

In Step 310, it is determined whether the removable component is bound to the first computing device.

In one or more embodiments of the invention, the removable component may be determined to be bound to the first computing device by comparing a binding of the removable component to an identifier of the first computing match. If the binding matches the identifier of the first computing device, the removable component is determined as being bound to the first computing device.

If the removable component is bound to the first computing device, the method proceeds to Step 308. Step 308 is discussed above. If the removable component is not bound to the first computing device, the method proceeds to Step 312.

In Step 312, the removable component is disabled.

In one or more embodiments of the invention, the removable component may be disabled by prevent a primary and/or secondary function of the removable component from being performed.

Figure 3E:
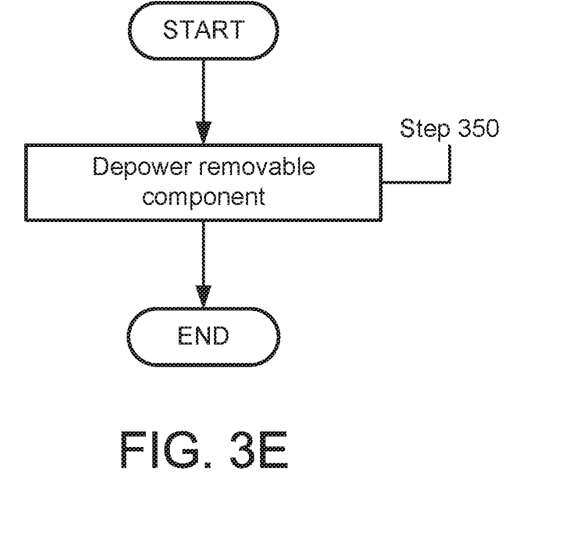
FIG. 3E shows a flowchart of a method of disabling a removable component in accordance with one or more embodiments of the technology.

In one or more embodiments of the invention, the removable component may be disable via the method shown in FIG. 3E.

The method may end following Step 312.

FIG. 3B shows a flowchart of a method in accordance with one or more embodiments of the invention. The method depicted in FIG. 3B may be used to determine whether a removable component is bound to a second computing device in accordance with one or more embodiments of the invention. The method shown in FIG. 3B may be performed by, for example, a component manager (120, FIG. 1B). The method may be performed by other components of the computing device (100, FIG. 1B) without departing from the invention.

In Step 320, the removable component is partially activated.

In one or more embodiments of the invention, the removable component may be partially activated by partially powering the removable component.

In one or more embodiments of the invention, the removable component may be partially activated using a power supply of the computing device.

In Step 322, a binding is obtained from the removable component.

In one or more embodiments of the invention, the binding may be obtained by reading a persistent storage of the removable component. The persistent storage may be read while the removable component is partially powered.

In one or more embodiments of the invention, the binding may be obtained by receiving the binding from the removable component via an operable connection. The persistent storage may be received while the removable component is partially powered.

In Step 324, it is determined whether the binding exists.

In one or more embodiments of the invention, the binding may be determined as not existing by matching the binding to a predetermined byte sequence. The predetermined byte sequence may indicate that any binding that matches the aforementioned predetermined byte sequence is not bound to any computing device.

If the binding exists, the method proceeds to Step 326. If the binding does not exist, the method proceeds to Step 328.

In Step 326, the removable component is determined to be bound to the second computing device.

The method may end following Step 326.

Returning to Step 324, the method may proceed to Step 328 if the binding does not exist.

In Step 328, the removable component determined to not be bound to the second computing device.

In one or more embodiments of the invention, the removable component is determined to not be bound to any computing device in Step 328.

The method may end following Step 328.

FIG. 3C shows a flowchart of a method in accordance with one or more embodiments of the invention. The method depicted in FIG. 3C may be used to bind a removable component to the first computing device in accordance with one or more embodiments of the invention. The method shown in FIG. 3C may be performed by, for example, a component manager (120, FIG. 1B). The method may be performed by other components of the computing device (100, FIG. 1B) without departing from the invention.

In Step 330, an identifier of the first computing device is written to the persistent storage of the removable component as the binding of the removable component.

The method may end following Step 330.

FIG. 3D shows a flowchart of a method in accordance with one or more embodiments of the invention. The method depicted in FIG. 3D may be used to activate a removable component in accordance with one or more embodiments of the invention. The method shown in FIG. 3D may be performed by, for example, a component manager (120, FIG. 1B). The method may be performed by other components of the computing device (100, FIG. 1B) without departing from the invention.

In Step 340, the removable component is fully powered.

In one or more embodiments of the invention, the removable component may be fully activated using a power supply controlled by the computing device.

In one or more embodiments of the invention, fully powering the removable component may activate both of a primary function and a secondary function of the removable component.

The method may end following Step 340.

FIG. 3E shows a flowchart of a method in accordance with one or more embodiments of the invention. The method depicted in FIG. 3E may be used to disable a removable component in accordance with one or more embodiments of the invention. The method shown in FIG. 3E may be performed by, for example, a component manager (120, FIG. 1B). The method may be performed by other components of the computing device (100, FIG. 1B) without departing from the invention.

In Step 350, the removable component is depowered.

In one or more embodiments of the invention, the removable component may be depowered using a power supply controlled by the computing device.

In one or more embodiments of the invention, depowering the removable component may deactivate both of a primary function and a secondary function of the removable component.

The method may end following Step 350.

To further clarify embodiments of the invention, an explanatory example is shown in FIGS. 4A-4E. The example shown in FIGS. 4A-4E is included for explanatory purposes only and is not limiting.

EXAMPLE

In FIGS. 4A-4E, the state of a blade server (400) is illustrated at different points in time. At the different points in time, various modules with various bindings are disposed in a chassis of the blade server (400) and the blade server (400) takes appropriate action based on the bindings.

Figure 4A:
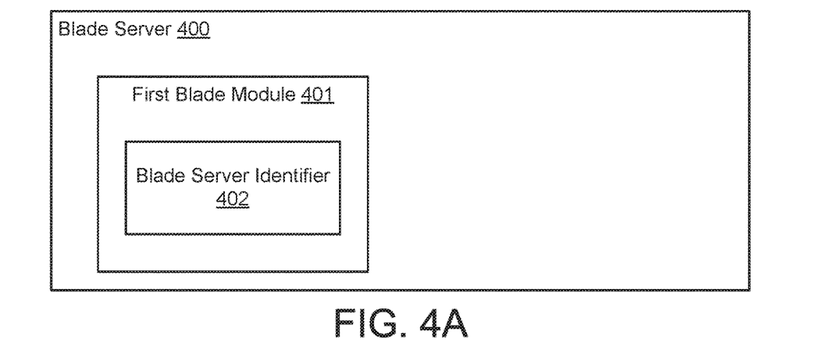
FIG. 4A shows a diagram of an example blade server at a first point in time.

FIG. 4A shows a diagram of the state of a blade server (400) at a first point in time. The blade server includes bays for housing removable components and implements the method illustrated in FIGS. 3A-3E.

A first blade module (401) is disposed in a bay of the blade server (400). The first blade module (401) includes a binding, stored on a persistent storage of the first blade module (401), that includes the blade server identifier (402). Since the binding matches the blade server (400), the blade server (400) provides power to the first blade module (401) via a power supply (not shown) controlled by the blade server (400).

Figure 4B:
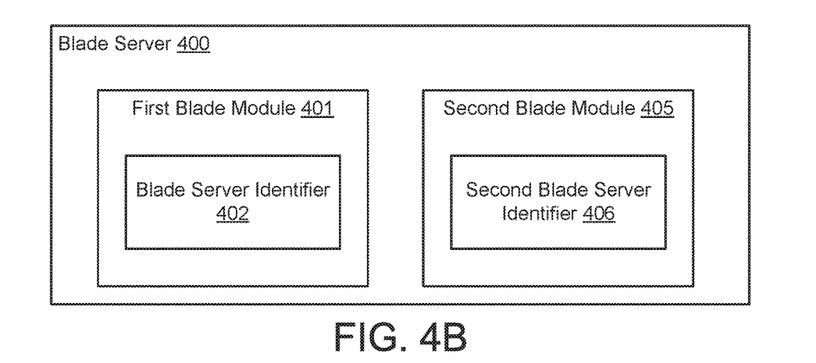
FIG. 4B shows a diagram of the example blade server at a second point in time.

FIG. 4B shows a diagram of the state of the blade server (400) at a second point in time. At the second point in time a second blade module (405) has been inserted into the chassis of the blade server (400). In contrast to the first blade module (401), the second blade module (405) has a binding that includes a second blade server identifier (406). Since the binding indicates that the second blade module (405) is bound to a second blade server (not shown), the blade server (400) disables the second blade module (405) by restricting power from being delivered to the second blade module (405) via the power supply (not shown) controlled by the blade server (400).

Figure 4C:
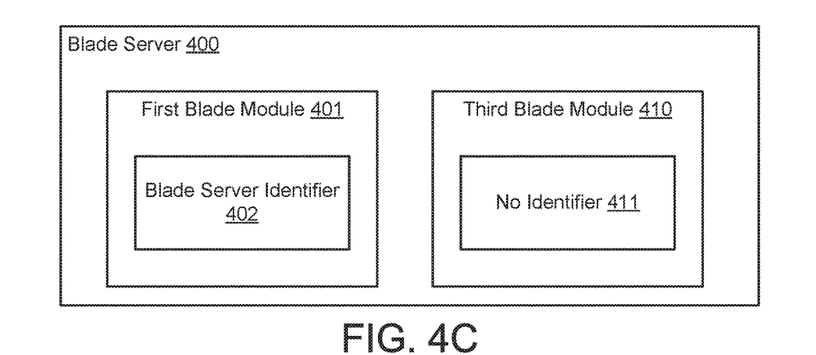
FIG. 4C shows a diagram of the example blade server at a third point in time.

FIG. 4C shows a diagram of the state of the blade server (400) at a third point in time. At the third point in time a third blade module (410) has been inserted into the chassis of the blade server (400). In contrast to the first blade module (401) and the second blade module (405), the third blade module (410) has a binding that does not include an identifier of any computing device. Since the binding indicates that the third blade module (410) is not bound any computing devices, the blade server (400) initiates a binding procedure to bind the third blade module (410) to the blade server (400).

Figure 4D:
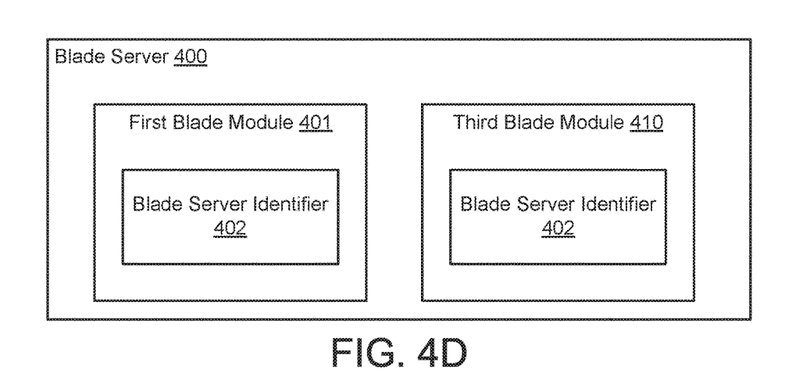
FIG. 4D shows a diagram of the example blade server at a fourth point in time.

FIG. 4D shows a diagram of the state of the blade server (400) at a fourth point in time. At the fourth point in time the third blade module (410) has been bound to the blade server (400) as indicated by the blade server identifier (402) being included in the binding of the third blade module (410). Since the binding now indicates that the third blade module (410) is bound to the blade server (400), the blade server (400) activates the third blade module (410) by fully powering the module using the power supply (not shown) controlled by the blade server (400).

Figure 4E:
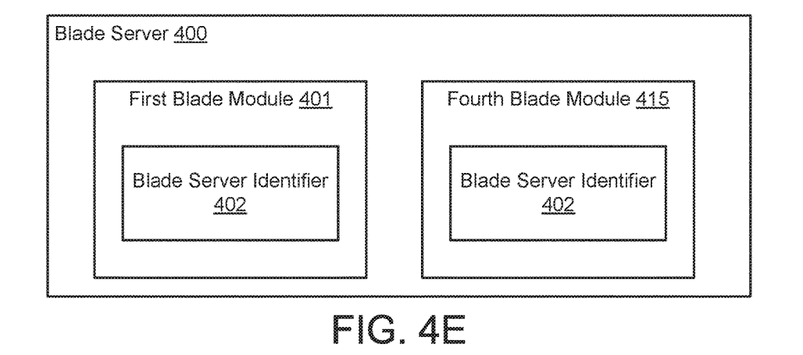
FIG. 4E shows a diagram of the example blade server at a fifth point in time.

FIG. 4E shows a diagram of the state of the blade server (400) at a fifth point in time. At the fifth point in time the third blade module (410) has been replaced with a fourth blade module (415). Since the fourth blade module (415) has a binding that indicates that the fourth blade module (415) is bound to the blade server (400), the blade server (400)

activates the fourth blade module (415) by fully powering the module using the power supply (not shown) controlled by the blade server (400).

The example ends after the state illustrated in FIG. 4E.

One or more embodiments of the invention may be implemented using instructions executed by one or more processors in the data storage device. Further, such instructions may correspond to computer readable instructions that are stored on one or more non-transitory computer readable mediums.

Additionally, one or more embodiments of the invention may improve the management of removable components of computing devices. Due to the proliferation of ubiquitous compatibility between removable components and computing devices due to common standards for bus and interconnect architectures, removable components may be moved between computing devices. Embodiments of the invention may provide methods, systems, and devices for binding removable components to computing devices so that logical collections of removable components and computing devices may be formed. Computing devices in accordance with embodiments of the invention may take action to prevent removable computing devices from being used outside of their respective logical collection and thereby improve the manageability of removable components of computing devices by preventing the aforementioned removable components from being used outside of their respective logical collections. Embodiments of the invention may be used for other purposes and/or provide other functionality without departing from the invention.

For example, one or more embodiments of the invention may enable one or more of the following: i) binding of removable component to computing devices to form logical collections, ii) prevent removable components from being inadvertently moved between computing devices, and iii) improve the manageability of ubiquitously compatible removable components by prevent the aforementioned removable components from being activated outside of a computing device from which the removable components are bound.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computing device, comprising:
    a chassis; and
    a processor programmed to:
        obtain a computing device identifier from a removable component disposed in the chassis;
        make a first determination that the removable component is bound to a second computing device based on the obtained computing device identifier; and
        in response to the first determination, disable the removable component, wherein disabling the removable component comprises depowering the removable component using a power supply.

2. The computing device of claim 1, wherein the processor is further programmed to:
    obtain a second computing device identifier from a second removable component disposed in the chassis;
    make a second determination that the removable component is bound to the computing device based on the obtained second computing device identifier; and
    in response to the second determination, fully power the second removable component.

3. The computing device of claim 2, wherein making the second determination comprises:
    making a third determination that the obtained second computing device identifier matches a computing device identifier of the computing device.

4. The computing device of claim 1, wherein the processor is further programmed to:
    obtain a second computing device identifier from a second removable component disposed in the chassis;
    make a second determination that the second removable component is not bound to any computing device based on the obtained second computing device identifier; and
    in response to the second determination:
        bind the second removable component to the computing device, and
        fully power the second removable component.

5. The computing device of claim 4, wherein making the second determination comprises:
    making a third determination that the obtained second computing device identifier is unused.

6. The computing device of claim 4, wherein binding the second removable component to the computing device comprises:
    replacing the second computing device identifier of the second removable component with a computing device identifier of the computing device.

7. The computing device of claim 4, wherein the second removable component is fully powered by the computing device using a power supply.

8. The computing device of claim 1, wherein the computing device identifier from the removable component disposed in the chassis is obtained in response to the removable component being inserted into the chassis.

9. The computing device of claim 1, wherein obtaining the computing device identifier from the removable component disposed in the chassis comprises:
    partially powering the removable component using a power supply while the removable component is disposed in the chassis; and
    reading the computing device identifier via an operable connection between the computing device and the removable component that operates while the removable component is disposed in the chassis.

10. The computing device of claim 9, wherein the operable connection is inoperable while the removable component is not disposed in the chassis.

11. The computing device of claim 9, wherein partially powering the removable component enables a secondary function of the removable component to be performed while preventing a primary function of the removable component from being performed.

12. The computing device of claim 11, wherein the secondary function enables the computing device identifier of the removable component to be read.

13. The computing device of claim 1, wherein making the first determination comprises:
    making a second determination that the obtained computing device identifier does not match a computing device identifier of the computing device.

14. A method for operating a computing device, the method comprising:
    obtaining a computing device identifier from a removable component disposed in a chassis of the computing device;

making a first determination that the removable component is bound to a second computing device based on the obtained computing device identifier; and in response to the first determination, disabling the removable component, wherein disabling the removable component comprises depowering the removable component using a power supply.

15. The method of claim 14, further comprising:

obtaining a second computing device identifier from a second removable component disposed in the chassis;

making a second determination that the removable component is bound to the computing device based on the obtained second computing device identifier; and in response to the second determination, fully powering the second removable component.

16. The method of claim 14, further comprising:

obtaining a second computing device identifier from a second removable component disposed in the chassis;

making a second determination that the second removable component is not bound to any computing device based on the obtained second computing device identifier; and in response to the second determination:
   binding the second removable component to the computing device, and
   fully powering the second removable component.

17. A non-transitory computer readable storage medium storing instructions, the instructions when executed by a processor cause the processor to perform a method of operating a computing device, the method comprising:

obtaining a computing device identifier from a removable component disposed in a chassis of the computing device;

making a first determination that the removable component is bound to a second computing device based on the obtained computing device identifier; and in response to the first determination, disabling the removable component, wherein disabling the removable component comprises depowering the removable component using a power supply.

18. The non-transitory computer readable medium storing instructions of claim 17, wherein the method further comprises:

obtaining a second computing device identifier from a second removable component disposed in the chassis;

making a second determination that the removable component is bound to the computing device based on the obtained second computing device identifier; and in response to the second determination, fully powering the second removable component.

19. The non-transitory computer readable medium storing instructions of claim 17, wherein the method further comprises:

obtaining a second computing device identifier from a second removable component disposed in the chassis;

making a second determination that the second removable component is not bound to any computing device based on the obtained second computing device identifier; and in response to the second determination:
   binding the second removable component to the computing device, and
   fully powering the second removable component.

* * * * *